United States Patent [19]

Rudigier

[11] Patent Number: 5,537,257
[45] Date of Patent: Jul. 16, 1996

[54] OPTICAL STRUCTURAL ELEMENT, METHOD FOR THE PRODUCTION OF A LAYER, LAYER OR LAYER SYSTEM AND ITS USE

[75] Inventor: Helmut Rudigier, Bad Ragaz, Switzerland

[73] Assignee: Balzers Aktiengesellschaft, Furstentum, Liechtenstein

[21] Appl. No.: 167,767

[22] Filed: Dec. 15, 1993

[30] Foreign Application Priority Data

Dec. 21, 1992 [CH] Switzerland ............... 03901/92

[51] Int. Cl.$^6$ ............... G02B 1/10
[52] U.S. Cl. ............ 359/580; 359/582; 359/585; 359/589; 427/164; 427/166
[58] Field of Search ............. 359/582, 585; 427/164, 166

[56] References Cited

U.S. PATENT DOCUMENTS

| | | | |
|---|---|---|---|
| 3,815,978 | 6/1974 | Marinace | 359/361 |
| 3,934,961 | 1/1976 | Itoh et al. | 359/586 |
| 3,958,042 | 5/1976 | Katsube et al. | 427/162 |
| 4,129,434 | 12/1978 | Plumat et al. | 65/60 D |
| 4,161,560 | 7/1979 | Kienel | 428/213 |
| 4,365,013 | 12/1982 | Ishioka et al. | 430/57 |
| 5,168,023 | 12/1992 | Mitani et al. | 430/58 |
| 5,216,551 | 6/1993 | Fujii | 359/884 |
| 5,232,790 | 8/1993 | Arimure et al. | 428/694 |
| 5,286,217 | 12/1993 | Kimock et al. | 428/216 |
| 5,314,734 | 5/1994 | Nishida et al. | 428/64 |
| 5,346,600 | 9/1994 | Nieh et al. | 204/192.3 |
| 5,374,318 | 12/1994 | Rabalais et al. | 148/33 |
| 5,424,876 | 6/1995 | Fujii | 359/884 |

*Primary Examiner*—Paul M. Dzierzynski
*Assistant Examiner*—John Juba, Jr.
*Attorney, Agent, or Firm*—Notaro & Michalos

[57] ABSTRACT

An optical structural element has a substrate and includes at least one wear protection system built up of one or several layers on the substrate. The layers are of at least one of the materials $ZrO_2$, $AlN$, $(Al,Cr)_2O_3$, $BN$ and diamond. A total thickness of the layers is more than about 100 nm and the mean transmission of the wear protection system is at least 10% in a spectral band of 10 nm within the visible light spectrum.

36 Claims, 3 Drawing Sheets

OPTICAL STRUCTURAL ELEMENT, METHOD FOR THE PRODUCTION OF A LAYER, LAYER OR LAYER SYSTEM AND ITS USE

FIELD AND BACKGROUND OF THE INVENTION

The present invention relates to an optical structural element, a method for the production of a layer, a layer itself or a layer system.

Optical structural elements for effecting the transmission of light in the visible spectrum, comprising at least one layer system on a substrate, are sufficiently known, such as for example, from coated glasses. The function of an optical structural element of this type is based on the principle of interference and for that reason at least one transition is provided between materials having a high and a low index of refraction.

The following definitions are used:
Spectrum of visible light:
Spectral range corresponding to a wavelength of 380 nm to 780 nm
Extinction coefficient:
When light of intensity $I_0$ impinges on a material of thickness d and at the exit side the intensity is I, then $$I = I_0 \exp(-\alpha(\lambda)d) \quad (1)$$

with $$k(\lambda) = \alpha(\lambda) \cdot \lambda / 4\pi \quad (2)$$

where $\lambda$ is the wavelength of the impinging light, $k(\lambda)$ is the extinction coefficient, and $\alpha(\lambda)$ is the absorption coefficient,
Average extinction constant $\bar{k}$:
In a considered spectral range between a lower wavelength $\lambda_u$ and an upper wavelength $\lambda_o$ applies for the average extinction constant $\bar{k}$:

$$\bar{k} = \frac{1}{\Delta\lambda} \int_{\lambda_u}^{\lambda_o} k(\lambda) \, d\lambda \quad (3)$$

with $$\Delta\lambda = \lambda_o - \lambda_u \quad (4)$$

Transmission:
From (1) the transmission T for light of wavelength $\lambda$ is obtained (neglecting reflection at the surfaces) as:

$$T(\lambda) = \frac{I}{I_0} = \exp(-\alpha(\lambda) \cdot d) \quad (5)$$

While consequently the extinction constant k is a material constant, the transmission is a function of thickness d of the material considered.
Average transmission:
For the average transmission T in a spectral band corresponding to a lower wavelength $\lambda_u$ and an upper $\lambda_o$ the following applies:

$$\bar{T} = \frac{1}{\Delta\lambda} \int_{\lambda_u}^{\lambda_o} T(\lambda) \, d\lambda \quad (6)$$

For optical structural elements which are to be used in the visible spectral range most layers are typically thinner than 100 nm.

As layer materials of layers effective in the visible spectral range are used primarily oxides of group IVa, such as $TiO_2$, $ZrO_2$, $HfO_2$, of group IVb, here in particular $SiO_2$, of group IIIa, such as $Al_2O_3$, $Y_2O_3$, $Sc_2O_3$, further of group Va, such as $Ta_2O_5$, $Nb_2O_3$, and oxides or fluorides of some rare earths, such as for example $CeO_2$, $LaF_2$ as well as fluorides of groups IIa and lead fluoride as well as silicon nitride. Some of these materials can also be produced in different modifications which are largely determined by production parameters such as "coating temperature", energy of the coat-forming particles, which modifications, in turn, yield different hardnesses.

The hardness of the layers comprising the stated materials, which are customarily produced by vapor deposition, is relatively low, often lower than the Knoop hardness $HK_{50g}$ of broad-glass which is approximately 650.

Materials such as are used in other subfields of coating technology, namely as wear protection coats for tools, are nitrides, carbides and carbonitrides of groups IVa, Va, and VIa, further nitrides of Ti, Al or $Al_2O_3$, BN and diamond. For this purpose hard layer systems offering protection against wear and tear must have a total thickness, 157 100 nm.

While layer systems protecting against wear of stated minimum thickness, comprising the listed layer materials, with the exception of BN and diamond, have a mean extinction constant, averaged in any given spectral band, of at least 10 nm within the visible light spectrum, which is significantly greater than $5 \cdot 10^{-2}$, and layer systems of the stated thickness have an average transmission In the stated spectral band which is significantly less than 10%; BN and diamond layers are presently not usable at commercially justifiable expenditures for optical purposes in tile visible spectral range.

SUMMARY OF THE INVENTION

The present invention is based on the task of describing an optical structural element of the above stated type in which a high protection against wear and tear is ensured.

The invention provides an optical structural element comprising substrate; and one wear protection system built of one or several layers on the substrate, the layers comprising at least one of the materials $ZrO_2$, AlN, $(Al,Cr)_2O_3$, BN and diamond; a total thickness of the layers are, 157 100 nm and the mean transmission of the wear protection system is at least 10 % in a spectral band of at least width 10 nm within the visible light spectrum between 380 nm and 780 nm.

For the invention the wear protection system is the totality of all layers comprising the stated materials, whose number as a minimum is one layer, and in particular independently of whether or not between these layers still further layers are provided for achieving a desired optical effect, but which themselves do not yield any or only a negligible wear protection effect. It is understood that the stated substrate can be implemented on both sides or on one side according to the invention, but wherein in the following the stated values with respect to the mean transmission refer to a unilaterally coated substrate or to a single wear protection system.

Surprisingly, a wear protection system comprising at least one wear protection layer can be successfully realized comprising a material used previously for wear protection on tools, but wherein, in spite of maintaining the minimum thickness of the wear protection system necessary for wear protection, according to the invention the stated minimum average transmission is achieved. Therewith an optical structural element with layers is realized which until now was used only for wear protection on parts such as tools, which far removed from into the category of "optical structural elements".

Where the band is significantly broader than 10 nm, preferably at least 100 nm, with the optical structural element according to the invention an average transmission is even achieved over a spectral band which is significantly wider than 10 nm, preferably is at least 100 nm or even extends over a significantly portion of the visible light spectrum.

Furthermore, glass is used as a preferred substrate in the optical structural element, wherein the hardness of at least one of the layers of the wear protection system is greater than that of the glass. In this way it is achieved that the glass, through the layer or layers of the invention is protected against wear, and specifically basically independent of whether or not above this stated layer and/or between it and the glass surface, additional layers are provided. It is essential that the stated layer, like the wear protection system provided according to the invention, have a targeted optical effect, for example of the additional provided layer system, and that it only impairs the optical effect insignificantly, or can even improve it.

$ZrO_2$ and $(Al, Cr)_2O_3$ are preferred layer materials in the wear protection system provided according to the invention.

The total thickness of the wear protection system is at least 1 μm, preferably even at least 1.5 μm or even at least 2 μm, the wear protection effect of the system is decisively increased and it is nevertheless not made impossible to realize the targeted optical properties.

A preferred embodiment of the wear protection system comprises at least one layer of $ZrO_2$ having a Vicker hardness of at least 1000, preferably even at least a Vicker hardness of 1200.

In a way which is far preferred today, the wear protection system provided according to the invention comprises at least a layer comprising that material which is produced by ion plating. All of the stated layers are preferably produced of the stated materials by ion plating.

When using a $ZrO_2$ layer of the above stated hardness it was found that independently of the method of production, consequently also during the production not by means of ion plating, with respect to the compressive stress in the layer the range $-5.5 \cdot 10^{-9}$ dyn/cm² comprises stress of the $ZrO_2$ layer, $157 \cdot 10^{-9}$ dyn/cm² should preferably be maintained. The symbol σ is used to denote the compressive stress of the layer. The advantage of producing the stated layers by means of ion plating resides in particular, in that with this method relatively low temperatures can be maintained from below 900° C. down to approximately 450° C. and lower, and this in particular for the production of $(Al, Cr)_2O_3$ layers wherein the alpha phase is stabilized by mixing in Cr.

Due to the low temperatures maintained through ion plating, the coating of glass substrates is readily possible.

Due to the fact that the $(Al, Cr)_2O_3$ layer preferably used according to the invention is low-refractive and the likewise preferably used $ZrO_2$ used according to the invention is high-refractive, the optical structural element can be build up in preferred manner.

However, in principle, a structural element according to the invention can comprise, in addition to the stated wear protection system further layers — intermediately placed in the wear protection system or superjacent or subjacent to it — so that the wear protection system becomes part of a total layer system on the substrate.

A metal layer or a metallic layer can additionally be provided, such as for example a silver, gold, titanium nitride or hafnium nitride layer. These layers are therein used for the purpose of achieving a desired transmission or reflection behavior, not for the purpose of wear protection.

The method according to the invention, in particular preferably for the production of a layer comprising $ZrO_2$ or $(Al, Cr)_2O_3$ is distinguished and resides, as has been explained, in producing a layer of this type through ion plating.

Only if the mean extinction constant of the stated materials, deposited according to the stated method, does not exceed the stated maximum values, does it become possible at all to use layers of the stated materials, whose thickness, necessary for their wear protection function, of more than 100 nm nevertheless yields a mean total transmission of at least 10%. And it yields this even if according to the method of the invention, the total thickness of one, two or more layers produced according to the invention reaches or exceeds 1 μm or even 1.5 μm or even 2 μm.

As has already been stated, success was achieved in producing layers comprising the stated materials and in particular comprising $ZrO_2$ or $(Al, Cr)_2O_3$ or layer systems comprising layers of this type, which act optically effective as wear protection on a structural element.

Consequently, a layer according to the invention comprising in particular $ZrO_2$ or $(Al, Cr)_2O_3$ is distinguished in that it makes possible the described use only thereby that the layer material-specific average extinction constant is at most $5 \cdot 10^{-2}$.

Preferred embodiments of the stated layer of a layer system comprising one, two or more layers of this type is also provided according to the invention.

A layer of this type or a layer system of this type is preferably deposited on glass, synthetic material or a metal or semiconductor as the carrier substrate, and is deposited in particular on glass for watch glasses, bar code scanners or welding protection devices.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

BRIEF DESCRIPTION OF THE DRAWINGS

In the following the invention will be explained by example in conjunction with examples and figures. The figures depict.

DESCRIPTION OF THE PREFERRED EMBODIMENTS

Definition:

When in the following the hardness of layers is stated, which are thinner than 1.5 μm, this hardness was measured on an identical layer of greater thickness. The specifications with layers of 1.5 μm and more were measured directly on the layer.

Example 1

Substrate:

Glass (refractive index n=1.52)

Hardness: 650 $HK_{50g}$

First layer:

3.2 μm $(Al,Cr)_2O_3$

Hardness: 2200 $HV_{15g}$

Second Layer:

62.5 nm $ZrO_2$

Hardness: 1150 $HV_{15g}$

Third layer:

81 nm $(Al,Cr)_2O_3$

Ambient medium: air

Figure 1:
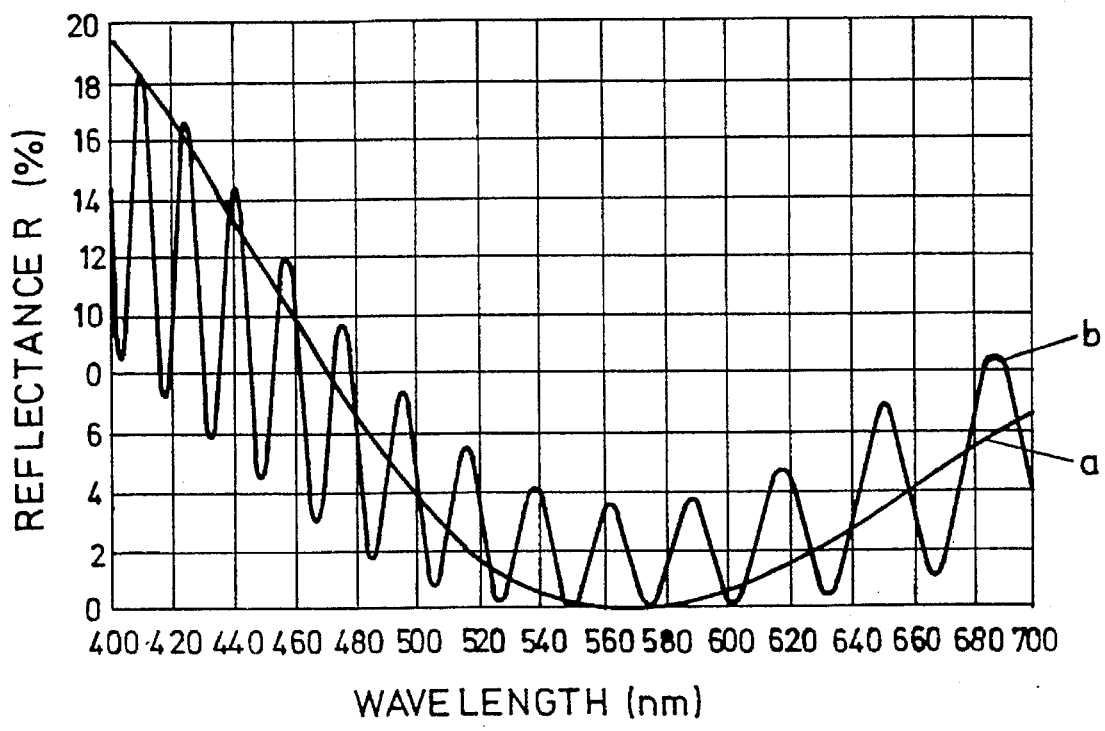
FIG. 1 the profile plotting wavelength against reflectance, of the reflectance coefficient on an optical structural element according to the invention built up according to Example 1.

FIG. 1 characterizes the behavior of an optical structural element according to Example 1, by the shape of curve 'a', however without a first layer, while the shape of curve 'b' represents the optical behavior of the structural element according to the invention with the first layer ensuring the wear protection.

Example 2:

Substrate:

Glass (refractive index n=1.52)

Hardness: 650 $HK_{50g}$

First layer:

198 nm $ZrO_2$

Hardness: 1150 $HV_{15g}$

Second layer:

2 μm $(Al,Cr)_2O_3$

Hardness: 2200 $HV_{15g}$

Ambient medium:

Air

Figure 2:
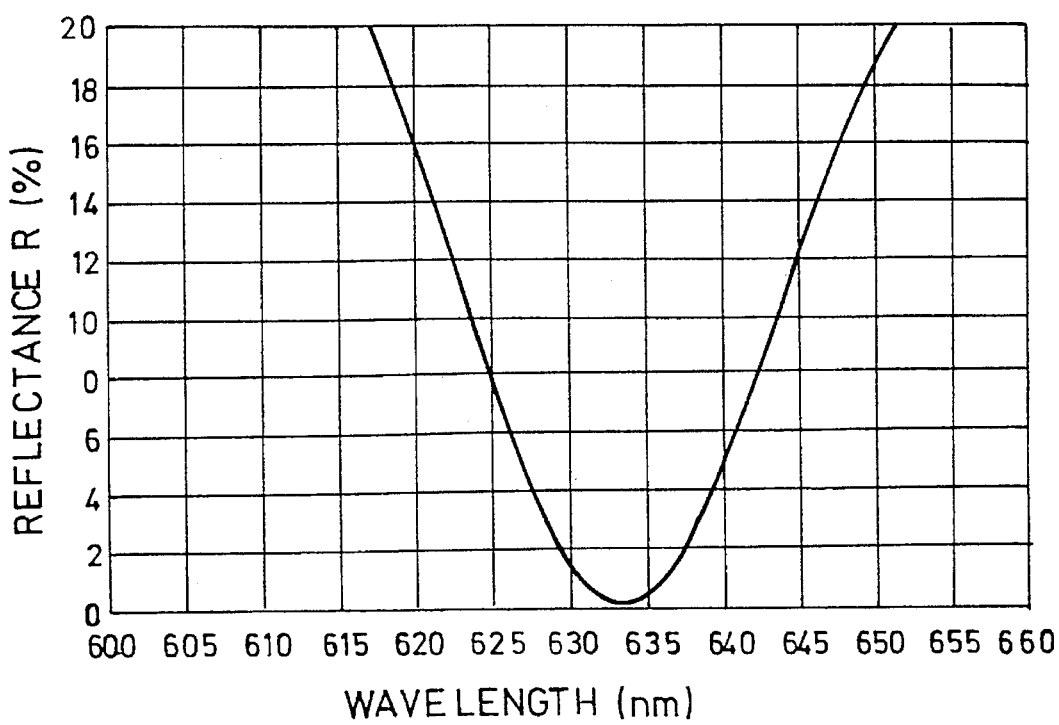
FIG. 2 the profile of the reflectance coefficient of an optical structural element according to the invention built up according to Example 2.

The reflection behavior of this structural element according to tile invention is depicted in FIG. 2. A reflection at 633 nm of 0.065 % results. Without thick wear protection layers comprising $(Al,Cr)_2O_3$ the reflection at 633 nm is 4.2%.

Example 3

Substrate:

Glass (refractive index n=1.52)

Hardness: 650 $HK_{50g}$

First layer:

3.2 μm $(Al,Cr)_2O_3$

Hardness: 2200 $HV_{15g}$

Second layer:

3.8 nm $ZrO_2$

Hardness: 1150 $HV_{15g}$

Third layer:

61 nm $(Al,Cr)_2O_3$

Hardness: 2200 $HV_{15g}$

Fourth layer:

59 nm $ZrO_2$

Hardness: 1150 $HV_{15g}$

Fifth layer:

70 nm $(Al,Cr)_2O_3$

Hardness: 2200 $HV_{15g}$

Ambient medium:

Air

Figure 3:
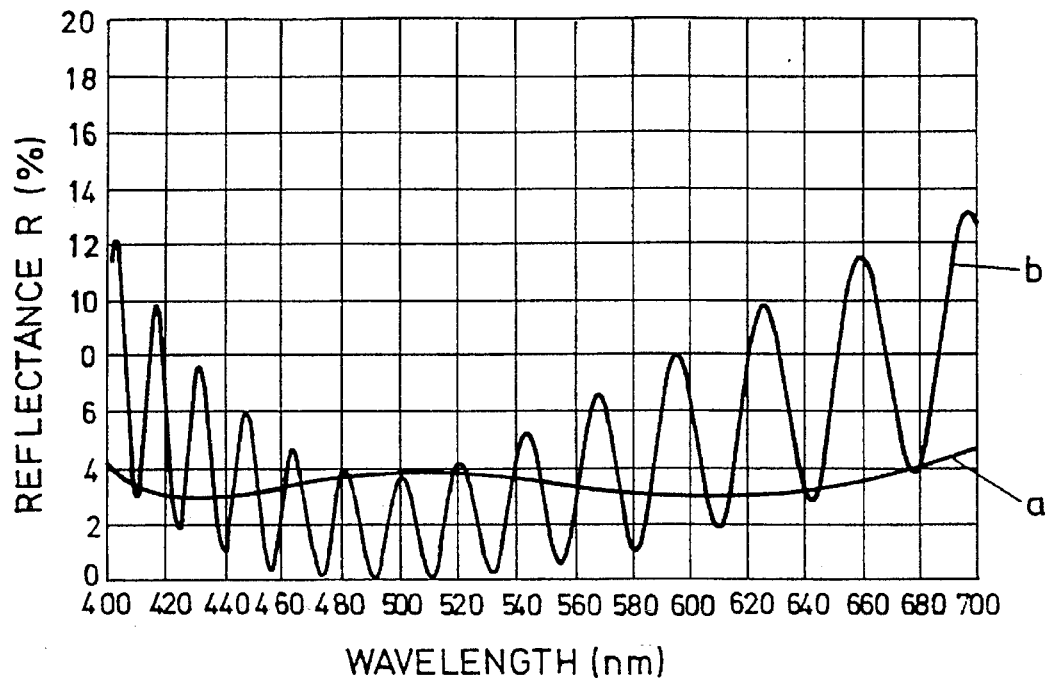
FIG. 3 the profile of the reflectance coefficient on an optical structural element according to the invention built up according to Example 3.

The reflection behavior of the optical structural element according to Example 3 is depicted in FIG. 3, wherein the profile 'a' represents the profile on the same structural element however without a first layer, consequently without wear protection layer, while profile 'b' represents the reflection profile on the structural element provided according to the invention with wear protection layer.

Figure 4:
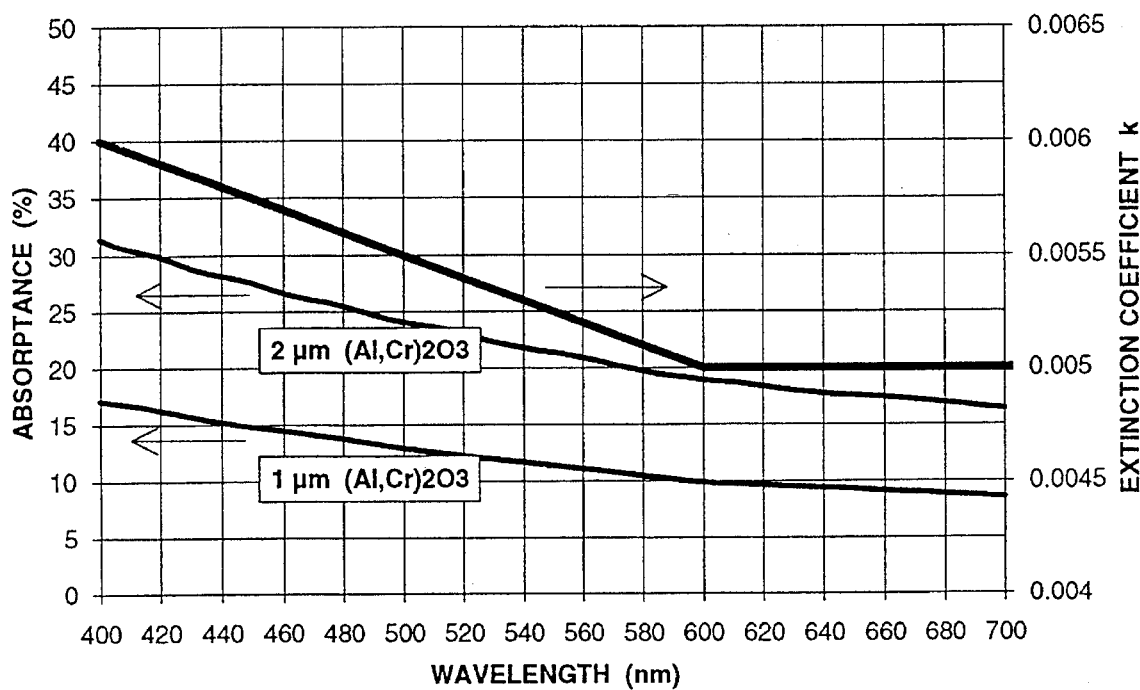
FIG. 4 the profile plotting wavelength against absorbance, of the absorption in percentages of a layer according to the invention at 1 μm and 2 μm thickness over the visible spectral range coefficient of extinction.

FIG. 4 describes the absorption $A(\lambda)$ defined by the percentage of light $I_A$ absorbed of the incident light $I_o$ over the most essential spectral range of the visible light, for a $(Al,Cr)_2O_3$ layer 1 μm thick and one $(Al,Cr)_2O_3$ layer 2 μm thick.

The 2 μm thick layer absorbs maximally approximately 30%, the 1 μm layer absorbs maximally approximately 16%.

The following results for the layers neglecting reflections in the entire spectral range shown $$1 = A(\lambda) + T(\lambda) \tag{7'}$$

a transmission $T(\lambda)$ of more than 70% or more than 84% in a wear protection system according to Example 1 having a thickness of 1 μm or 2 μm. The transmission $T(\lambda)$ for layers having a thickness of 3 μm becomes accordingly more than approximately 50%, according to Examples 1 and 3.

From $$A(\lambda) = \frac{I_A}{I_o} = 1 - e^{-\alpha(\alpha) \cdot d} \tag{8}$$

and with (2) for the $k(\lambda)$ values are obtained the estimated values which in FIG. 3 are also plotted.

The $k(\lambda)$ values are significantly smaller than $5 \cdot 10^{-2}$, even significantly smaller than $10^{-2}$ in the entire spectral range considered.

For 400 nm $$k(400) \approx 5.7 \cdot 10^{-3}$$

as a maximum value.

Consequently, in the spectral band with a width of significantly more than 10 nm, the mean transmission of the wear protection system required according to the invention, is maintained. For the layer material, the maximum permissible and required mean extinction constant is also maintained.

Figure 5:
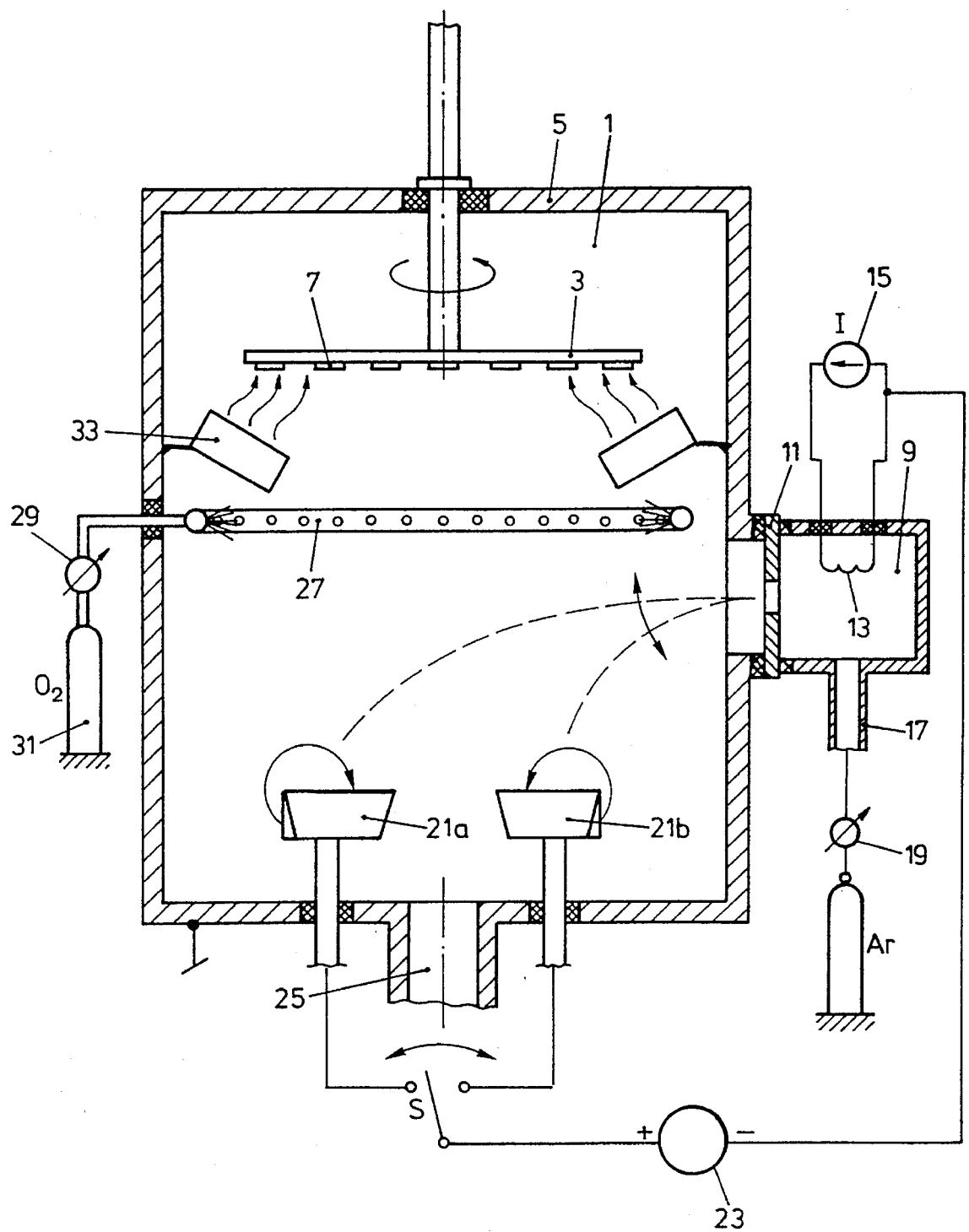
FIG. 5 an apparatus preferably used for the production of the layers according to Examples 1 to 3.

In the above described examples the $(Al,Cr)_2O_3$ layer as well as also the $ZrO_2$ layer was deposited with the apparatus depicted schematically in FIG. 5 which will be described in the following. The ion plating apparatus is a known device of type BAP800, produced by Balzers Aktiengesellschaft. It comprises a vacuum receptacle 1 with a workpiece carrier or calotte 3 which is electrically insulated, and is mounted so as to be rotationally driven on the wall 5 of the receptacle 1. It carries workpieces 7. An ionization chamber 9 is flanged on the wall 5 of the receptacle 1 to generate a low-voltage arc discharge. Chamber 9 communicates via a diaphragm 11, which is electrically insulated with respect to the wall 5 as well as also with respect to the wall of the ionization chamber 9, with the interior of the receptacle 1.

In the ionization chamber 9 an electron emission cathode 13 is provided in the form of a hot cathode, connected to a heating current generator 15. A working gas, preferably argon is introduced through a control valve 19 via a port 17 into the ionization chamber 9. One or, as depicted two or more selectively connectable electron beam vaporization devices 21a and 21b form the activated anodes of the low voltage discharge path in each instance. As is schematically represented with switch S, they are selectively connectable via source 23 to anodic potential with respect to the hot cathode 13. In addition to an evacuation port 25 for a vacuum pump, a reactive gas output arrangement 27 is provided in the receptacle 1, and in the case addressed here, it is connected via a control valve arrangement 29 to an oxygen tank 31. Furthermore, a radiant heater 33 is provided in the proximity of the rotary concave carrier or calotte 3.

With an installation of this type the wear protection layer $(Al,Cr)_2O_3$ according to Examples 1 to 3 was produced as follows:

Operation:

Vaporization of (Al,Cr) by means of one of the electron beam vaporization devices provided, for example 21a.

Vaporized solid material (Al,Cr) with 67.5 percent by weight of Al and 32.5 percent by weight of Cr.

Argon pressure: $3 \cdot 10^{-4}$ mbars;

Partial pressure of oxygen: $3 \cdot 10^{-4}$ mbars;

Arc current of the low voltage discharge: 80 A;

Substrate temperature: T>450° C.;

Coating rate: 0.25 nm/sec;

Substrate bias: substrate electrically at floating potential;

Arc voltage of low voltage arc discharge at generator 23: 60 V dc.

For the production of the $ZrO_2$ layer Examples 1 to 3 were treated as follows:

Vaporization of Zr as solid material at the second electron beam vaporization device, for example 21b;

Argon pressure: $10^{-4}$ mbars;

Partial pressure of oxygen: $7 \cdot 10^{-4}$ mbars;

Arc current of low voltage arc discharge: 50 A;

Arc voltage of this discharge: 60 V;

Substrate temperature: T,157 350° C.;

Coating rate: 0.3 nm/sec;

Substrate bias: insulated substrate at floating potential.

In the examples HK denotes the Knoop hardness and HV the Vickers hardness.

The $ZrO_2$ layers listed with the stated examples and produced as has been described, have at 633 nm wavelength a refractive index n=2.17 and an extinction coefficient $k(633\ nm) < 8 \cdot 10^{-4}$.

The $(Al,Cr)_2O_3$ layers produced as described on the listed examples have a refractive index between 1.8 and 1.9 at a wavelength of 550 nm and at this wavelength have an extinction coefficient $k(550\ nm) < 5 \cdot 10^{-3}$.

Due to the high wear protection achieved on the optical structural elements according to the invention, these can be used in particular also for applications in which glass, such as clear glass, green glass, quartz glass etc, metals or semiconductors are to be protected against wear and tear. For example, the optical structural element according to the invention and/or in particular the optically transparent wear protection layer according to the invention is typically used for watch glass coatings, bar code scanner covers, application within the scope of welding protection devices etc. Consequently in principle the invention is used for applications in which such elements are exposed to strong wear phenomena thereby that they used for example in industrial fabrication and, consequently, rough ambient conditions, and which nevertheless are to retain their optical behavior.

While a specific embodiment of the invention has been shown and described in detail to illustrate the application of the principles of the invention, it will be understood that the invention may be embodied otherwise without departing from such principles.

What is claimed is:

1. An optical element, comprising a substrate and a wear protection layer system on the substrate, wherein said wear protection layer system has an average transmission of at least 10% for light averaged in a spectral band with a band-width of at least 10 nm and located in a spectral range of between 380 nm and 780 nm and wherein said wear protection layer system comprises at least one layer of $(Al,Cr)_2O_3$ having a thickness which is at least 1 μm.

2. The optical element of claim 1, wherein said bandwidth is at least 100 nm.

3. The optical element of claim 1, wherein the substrate is a glass and wherein the hardness of said at least one layer of said wear protection layer system is larger than the hardness of said glass.

4. The optical element of claim 1, wherein the thickness of said wear protection layer system is a least 1.5μm.

5. The optical element of claim 1, wherein the thickness of said wear protection layer system is at least 2μm.

6. The optical element of claim 1, wherein said wear protection layer system further comprises a least one layer of $ZrO_2$ having a Vickers hardness of at least 1000.

7. The optical element of claim 6, wherein the Vickers hardness is at least 1200.

8. The optical element of claim 1, wherein said at least one layer is deposited by ion plating.

9. The optical element of claim 1, said wear protection layer system further comprising at least on layer of $ZrO_2$, having a compressive stress σ of $$-5.5 \cdot 10^{-9} dyn/cm^2, \leq \sigma, \leq 10^{-9} dyn/cm^2.$$

10. The optical element of claim 1, comprising a system of layers of high refractive and low refractive materials.

11. The optical element of claim 10, wherein said wear protection layer system is part of said system of layers.

12. The optical element of claim 1, further comprising at least one metallic layer.

13. The optical element of claim 1, wherein the thickness of said at least one layer is at least 1.5μm.

14. The optical element of claims 1, wherein the Vickers hardness of said at least one layer is larger than 1200.

15. The optical element of claim 1, wherein the extinction coefficient of said at least one layer is lower than 0.05.

16. The optical element of claim 1, wherein said wear protection layer system comprises layers of high refractive and low refractive materials.

17. The optical element of claim 1, wherein said substrate comprises one of a watch glass, a bar code scanner glass and of a welding protection glass.

18. A method for the production of a wear protection layer system on a substrate, so that said layer system has an average extinction constant of at most $5 \cdot 10^{-2}$, averaged in a spectral band of at least 10 nm located in a spectral band of 380 nm to 780 nm, comprising the step of depositing on said substrate, at least one layer of said wear protection layer system with a thickness of at least 1 μm and of $(Al,Cr)_2O_3$ by means of ion plating.

19. The method of claims 18, comprising the step of depositing one of said wear protection layer system and said at least one layer with a thickness of at least 1.5 μm.

20. The method of claim 18, further comprising the step of depositing a layer of $ZrO_2$.

21. The method of claim 20, including depositing said layer of $ZrO_2$ by means of ion plating.

22. An optical element, comprising a substrate and a wear protection layer system, wherein said wear protection layer system has an average extinction constant of at most $5 \cdot 10^{-2}$, averaged in a spectral band of at least 10 nm located in the spectral band of 380 nm to 780 nm, and wherein said wear protection layer system comprises at least one layer of $(Al,Cr)_2O_3$ having a thickness which is at least 1 µm.

23. A wear protection layer system, comprising at least one layer of $(Al,Cr)_2O_3$ with a thickness of at least 1 µm and having an average extinction constant of at most $5 \cdot 10^{-2}$, averaged over a spectral band of at least 10 nm located in the spectral band of 380 nm to 780 nm.

24. The layer system of claim 23, wherein said spectral band is at least 100 nm.

25. The layer system of claim 23, the hardness of said at least one layer being larger than the hardness of glass.

26. The layer system of claim 23, having a thickness of at least 1.5 µm.

27. The layer system of claim 23, having a thickness of at least 2 µm.

28. The layer system of claim 23, further comprising at least one layer of $ZrO_2$ having a Vickers hardness of at least 1000.

29. The layer system of claim 28, wherein said $ZrO_2$ layer has a vickers hardness of at least 1200.

30. The layer system of claim 23, wherein said at least one layer is deposited by ion platting.

31. The layer system of claim 23, further comprising at least one layer of $ZrO_2$, wherein a compressive stress $\sigma$ is $$-5.5 \cdot 10^{-9} \text{dyn/cm}^2, \leq \sigma, \leq 10^{-9} \text{dyn/cm}^2.$$

32. The layer system of claim 23, comprising layers of high refractive and of low refractive materials.

33. The layer system of claim 23, further comprising at least one metallic layer.

34. The layer system of claim 23, wherein said at least one layer is at least 1.5 µm thick.

35. The layer system of claim 23, wherein the Vickers hardness of said at least one layer is larger than 1200.

36. The layer system of claim 23, wherein the extinction coefficient of said at least one layer is lower than 0.05.

* * * * *